US010575507B2

(12) United States Patent
Takamatsu et al.

(10) Patent No.: US 10,575,507 B2
(45) Date of Patent: Mar. 3, 2020

(54) SPINNING REEL

(71) Applicant: Shimano Inc., Sakai, Osaka (JP)

(72) Inventors: Takuji Takamatsu, Osaka (JP); Kei Saito, Osaka (JP); Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/129,459

(22) Filed: Sep. 12, 2018

(65) Prior Publication Data

US 2019/0124901 A1 May 2, 2019

(30) Foreign Application Priority Data

Oct. 27, 2017 (JP) .................................. 2017-208613

(51) Int. Cl.
*A01K 89/01* (2006.01)
(52) U.S. Cl.
CPC ....... *A01K 89/0111* (2013.01); *A01K 89/0114* (2013.01); *A01K 89/01082* (2015.05)
(58) Field of Classification Search
CPC .................... A01K 89/01121; A01K 89/0114
See application file for complete search history.

(56) References Cited

U.S. PATENT DOCUMENTS

| 5,350,130 | A | * | 9/1994 | Hitomi | ............... | A01K 89/0114 |
|---|---|---|---|---|---|---|
| | | | | | | 242/241 |
| 5,662,285 | A | * | 9/1997 | Hashimoto | ........ | A01K 89/0114 |
| | | | | | | 242/241 |
| 5,667,159 | A | * | 9/1997 | Carpenter | .......... | A01K 89/0108 |
| | | | | | | 242/233 |
| 5,775,612 | A | * | 7/1998 | Hashimoto | ........ | A01K 89/0114 |
| | | | | | | 242/241 |
| 5,934,586 | A | * | 8/1999 | Kang | .................. | A01K 89/0114 |
| | | | | | | 242/241 |
| 9,706,761 | B1 | * | 7/2017 | Ochiai | ............. | A01K 89/01083 |
| 2003/0111569 | A1 | * | 6/2003 | Hitomi | ........... | A01K 89/011223 |
| | | | | | | 242/321 |
| 2005/0145735 | A1 | * | 7/2005 | Ikuta | ....................... | A01K 89/01 |
| | | | | | | 242/307 |
| 2017/0208786 | A1 | * | 7/2017 | Ochiai | ............. | A01K 89/01081 |

FOREIGN PATENT DOCUMENTS

JP 2015-35986 A 2/2015

* cited by examiner

*Primary Examiner* — Emmanuel M Marcelo
(74) *Attorney, Agent, or Firm* — Global IP Counselors, LLP

(57) ABSTRACT

A spinning reel includes a handle, a housing, a rotor, a bail arm, a moving member and an abutting member. The bail arm is attached to the rotor and is pivotable between a first posture and a second posture. The moving member is positioned in a first position when the bail arm is in the first posture, moving member positioned in a second position behind the first position when the bail arm is in the second posture, and is rotatable together with the rotor. The abutting member is attached to the housing and abuts the moving member in the second position to move the moving member toward the first position. The returning device returns the bail arm to the first posture from the second posture when the moving member moves toward the first position from the second position.

8 Claims, 9 Drawing Sheets

SPINNING REEL

CROSS-REFERENCE TO RELATED APPLICATIONS

This application claims priority to Japanese Patent Application No. 2017-208613 filed on Oct. 27, 2017. The entire disclosure of Japanese Patent Application No. 2017-208613 is hereby incorporated herein by reference.

BACKGROUND

Field of the Invention

The present invention relates to a spinning reel that is used for fishing.

Background Art

Japanese Laid-Open Patent Publication No. 2015-35986 (the '986 Publication) discloses a spinning reel that comprises a housing (housing part 10, first cover member 11, and second cover member 12) for accommodating a drive gear (drive gear 7) to which a handle is connected, a rotor and a bail arm (rotor 3) that rotate relative to the housing, and a spool (spool 4) that moves in a front-back direction with respect to the housing. The housing of the spinning reel also accommodates an oscillation mechanism (oscillation mechanism 6) that moves the spool in the front-back direction. The oscillation mechanism comprises a worm shaft (threaded shaft 21), a slider (slider 22) that is moved in the front-back direction with the rotation of the worm shaft, and a guide pin (first guide shaft 23a and second guide shaft 23b) that guides the movement of the slider.

In the spinning reel disclosed in the '986 Publication, a through-hole, through which a worm shaft (rod member) can pass, and two through-holes, through which two guide pins (rod members) can respectively pass, are disposed in the rear part of the housing, and each rod member is inserted into the housing from each through-hole. Each of the rod members is retained by a retainer that is attached to the rear part of the housing. However, generally in the process of developing a new spinning reel, when changing the specifications, design, etc., of the spinning reel, it is necessary to provide a through-hole in the front part of the housing through which a rod member can pass. In such a design, a dedicated retaining member for preventing the rod member from falling out of the through-hole is required.

SUMMARY

An object of the present invention is to provide a spinning reel that does not require a dedicated retaining member for preventing a rod member that is housed in the housing from falling out of a through-hole in the front part of the housing.

Thus, a spinning reel according to the present invention is directed to a spinning reel for fishing (for example, spinning reel 100) that can cast a fishing line, comprising a housing (for example, housing K of reel body 110), a rotor (for example, rotor 140), a bail arm (for example, bail arm 150), a moving member (for example, moving member 161), an abutting member (for example, abutting member 163), and a returning device (for example, toggle spring device 162). The housing accommodates a drive gear (for example, drive gear 111) to which a handle is attached (for example, handle 120). The rotor is mounted to rotate with respect to the housing in accordance with the rotation of the handle. The bail arm is attached to the rotor and pivots between a first posture (for example, a line-winding posture) for winding the fishing line around a spool and a second posture (for example, a line-releasing or casting posture) for casting the fishing line from the spool. The moving member is positioned in a first position when the bail arm is in the first posture and in a second position behind the first position when the bail arm is in the second posture and which rotates together with the rotor. The abutting member is attached to the housing and abuts the moving member that rotates together with the rotor in the second position to move the moving member toward the first position. The returning device returns the bail arm to the first posture from the second posture when the moving member moves toward the first position from the second position. The housing further houses a rod member (for example, first guide pin 114C), and comprises a through-hole (for example, first through-hole 115B) disposed in a front part (for example, planar portion K10) of the housing through which the rod member can pass, and that supports the front end of the rod member, and the abutting member comprises a blocking portion (for example, retainer 163F and a portion of abutting portion 163B in the vicinity of the retainer 163F) that blocks at least a part of the through-hole).

According to the configuration described above, because the abutting member blocks at least a part of a through-hole that is provided in a front part of the housing, the abutting member prevents the rod member from falling out of the through-hole. Therefore, the abutting member also serves as a retainer for the rod member, and thus a dedicated retaining member for preventing a rod member from falling out of a through-hole at a front part of a housing is not required.

The abutting member can have an inclined surface (for example, inclined surface 163A) that moves the moving member from the second position toward the first position as the rotor rotates.

With the configuration described above, because the moving member ascends the inclined surface, the moving member can smoothly rotate.

The housing can comprise a first housing member (for example, first housing member 115) that supports one end portion of the drive gear and a second housing member (for example, second housing member 116) that supports the other end portion of the drive gear, and the first housing member can comprise support portions (for example, support portions 115G and 115H) that work cooperatively with the drive gear and that rotatably support a pinion gear (for example, pinion gear 113) that rotates the rotor, and also can comprise the through-hole (for example, refer to FIG. 4) above the support portions.

According to the configuration described above, because the through-hole and the support portions are integrated in one of the housing members, the spinning reel can be easily assembled.

The housing can comprise a first housing member (for example, a first housing member 115) that supports one end portion of the drive gear and a second housing member (for example, a second housing member 116) that supports the other end portion of the drive gear. The abutting member can comprise an engagement portion (for example, projecting portion 163C, or, rotation stopper 163D and/or rotation stopper 163E) that engages at least one of the first housing member (for example, first housing member 115) and the second housing member (for example, second housing member 116), and at least one of the first housing member and the second housing member can comprise an engaged portion (for example, hole 116A, or, projecting portion K21 and/or K22) that engages the engagement portion.

According to the configuration described above, the abutting member and the housing can be engaged with each other by engagement between the engagement portion and the engaged portion, and, for example, it is possible to prevent the abutting member from moving.

At least one of the first housing member and the second housing member may comprise a planar portion (for example, planar portion K11 and/or K12) having a planar surface (for example, a front wall that faces forward) on which the abutting member is disposed. The engagement portion can comprise a first engagement portion (for example, second portion 163CB) that extends in a first direction and a second engagement portion (for example, third portion 163CC) that extends from the first engagement portion in a direction different that the first direction, and the engaged portion is a hole (for example, hole 116A) that is disposed on the planar portion and houses the engagement portion.

According to the configuration described above, it is possible to prevent the abutting member from falling out of the housing.

The engagement portion and the engaged portion can have the form of an L (for example, refer to FIGS. 7A and 7B).

According to the configuration described above, it is possible to prevent the abutting member from falling out of the housing with a simple configuration.

The engaged portion can be a notch (for example, hole 116A) disposed on an abutting end surface (for example, mating surface 116B) that is disposed on either the first housing member or the second housing member and that abuts the other housing member, and the engagement portion can be sandwiched between the first housing member and the second housing member (for example, refer to FIGS. 5 and 6).

According to the configuration described above, it is possible to fix the abutting member with a simple configuration.

At least one of the first housing member and the second housing member may comprise a planar portion (for example, planar portion K11 and/or K12) having a planar surface (for example, a front wall that faces forward) on which the abutting member is disposed. The engaged portion can be a projecting portion (for example, a projecting portion K21 and/or K22) that projects forward from the planar portion, and the engagement portion can abut the projecting portion (for example, rotation stopper 163D and/or rotation stopper 163E).

According to the configuration described above, it is possible to prevent the abutting member from rotating by the engagement portion abutting the engaged portion.

The rod member can be a guide pin (for example, first guide pin 114C) that is a component member of an oscillation mechanism (for example, oscillation mechanism 114) that moves the spool in the front-back direction of the rotor, and that guides the movement of a slider (for example, 114B) in the front-back direction.

According to the configuration described above, it is possible to prevent the guide pin from falling out of the through-hole with the abutting member.

According to the present invention, it is possible to provide a spinning reel that does not require a dedicated retaining member to prevent a rod member that is housed in the housing from falling out of a through-hole in a front part of the housing.

DETAILED DESCRIPTION OF THE EMBODIMENTS

Figure 1:
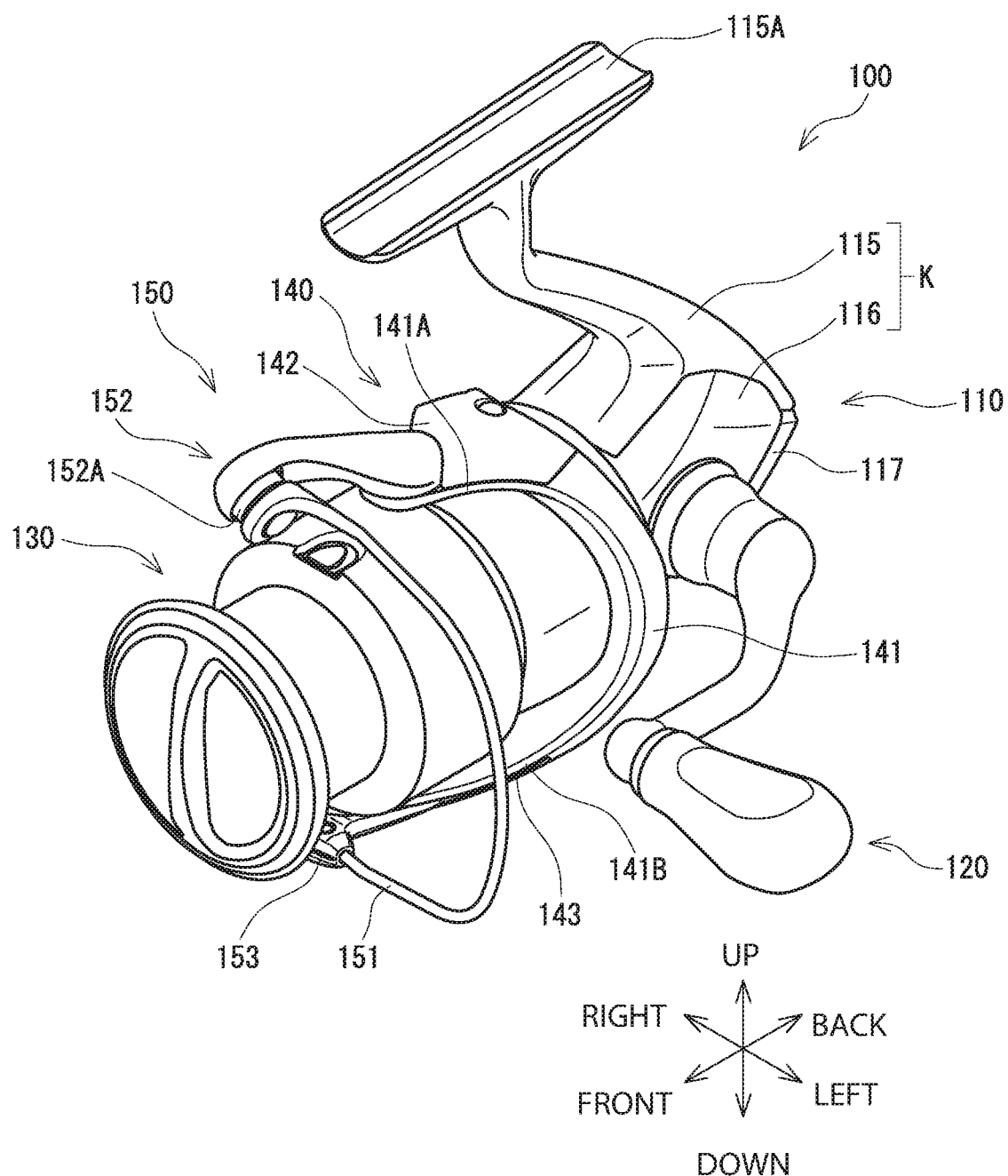
FIG. 1 is a perspective view of a spinning reel according to an embodiment of the present invention.

The spinning reel 100 for fishing according to the first embodiment of the present invention will be described below with reference to the drawings. In the description below, when the spinning reel 100 is attached to a fishing rod, the distal end direction of the fishing rod (direction in which the fishing line is cast or paid out from the spinning reel 100) is referred to as the "front," the rear end direction of the fishing rod is referred to as the "rear," the direction of the fishing rod as viewed from the spinning reel 100 is referred to as "up," the opposite direction is referred to as "down," and "right" and "left" refers to the "right" and "left" of a user that holds the fishing rod. In the drawings, the gear teeth are omitted. In addition, in the drawings, members are omitted as is suitable for clarification of the positional relationships between each of the members. Schematic configuration of the spinning reel 100

As shown in FIG. 1, the spinning reel 100 comprises a reel body 110, a handle 120, a spool 130, a rotor 140, and a bail arm 150. The reel body 110 comprises a drive mechanism that rotates the rotor 140 relative to the reel body 110 by receiving the rotation of the handle 120, and that moves the spool 130 back and forth relative to the reel body 110. A fishing line is wound around the spool 130. The bail arm 150 is attached to the rotor 140 so as to be pivotable between a line-winding posture (a first posture) for winding the fishing line around the spool 130, and a line-casting posture (a second posture) for casting (releasing) the fishing line from the spool 130. The bail arm 150 rotates relative to the reel body 110 together with the rotor 140.

Reel Body 110

The reel body 110 constitutes the body of the spinning reel 100. As shown in FIGS. 1-5, the reel body 110 comprises a drive gear 111, ball bearings 112A-112D, a pinion gear 113, an oscillation mechanism 114, a first housing member 115, a second housing member 116, a rear cover 117, a plate-like lid 118, a bolt B1, and a plurality of gears, which are not shown. The drive gear 111, pinion gear 113, oscillation mechanism 114, and the plurality of gears (not shown) constitute the drive mechanism. The handle 120 is attached to the reel body 110. If it is desired that the handle 120 be rotated with the left hand, the handle 120 is attached to the reel body 110 from the second housing member 116 side, as shown in FIG. 1. If it is desired that the handle 120 be rotated with the left hand, the handle 120 is attached to the reel body 110 from the first housing member 115 side (refer to the attachment portion P in FIG. 2 and FIG. 6). Although omitted in FIG. 2, FIG. 6, etc., a cover is attached to either the left or right attachment portion for the handle 120 to which the handle 120 is not attached (attachment portion P in FIG. 2 and FIG. 6).

Figure 2:
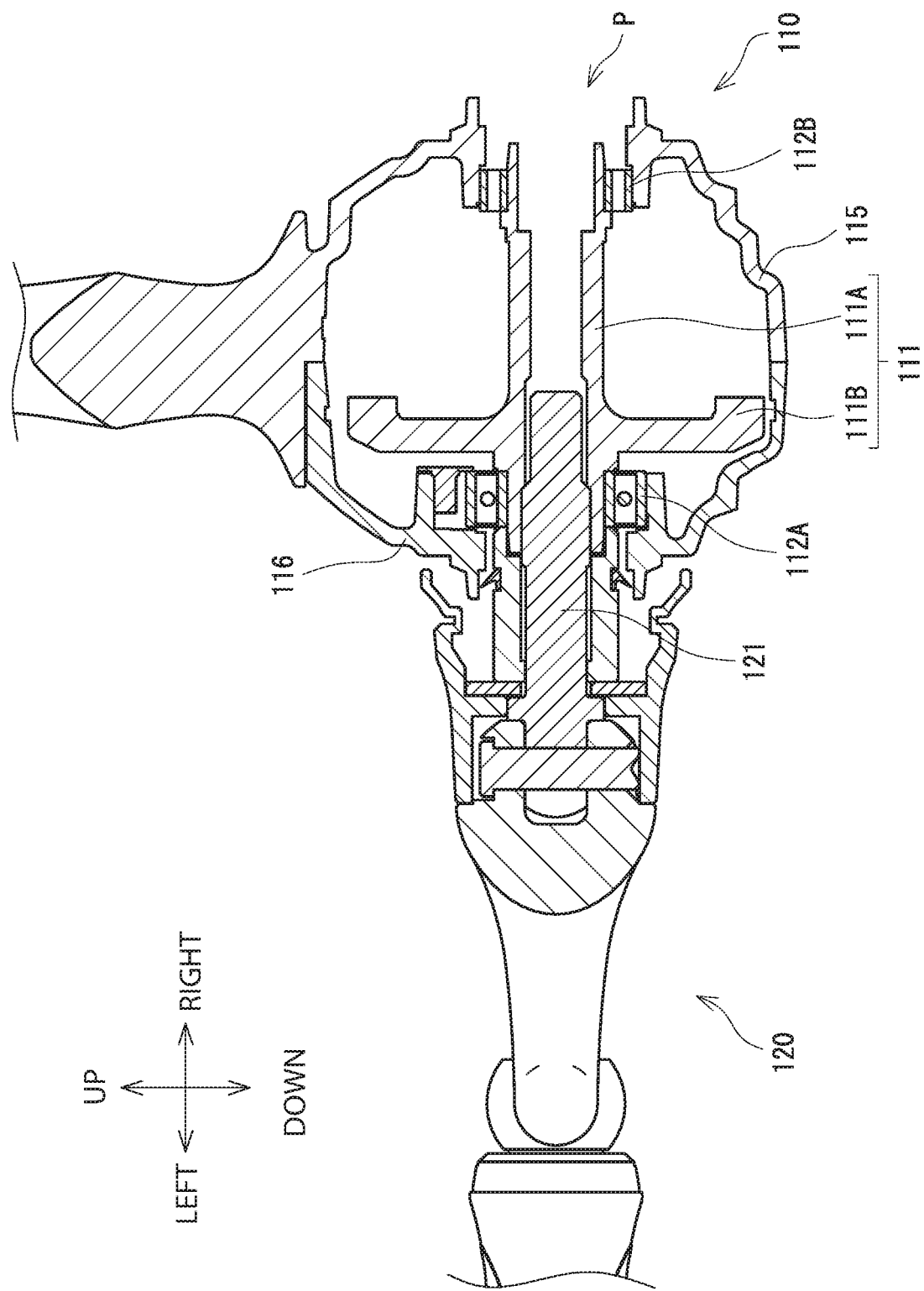
FIG. 2 is a cross-sectional view taken by cutting the spinning reel according to an embodiment of the present invention with a planar surface that extends in the vertical and lateral directions and that passes through the handle shaft.
Figure 3:
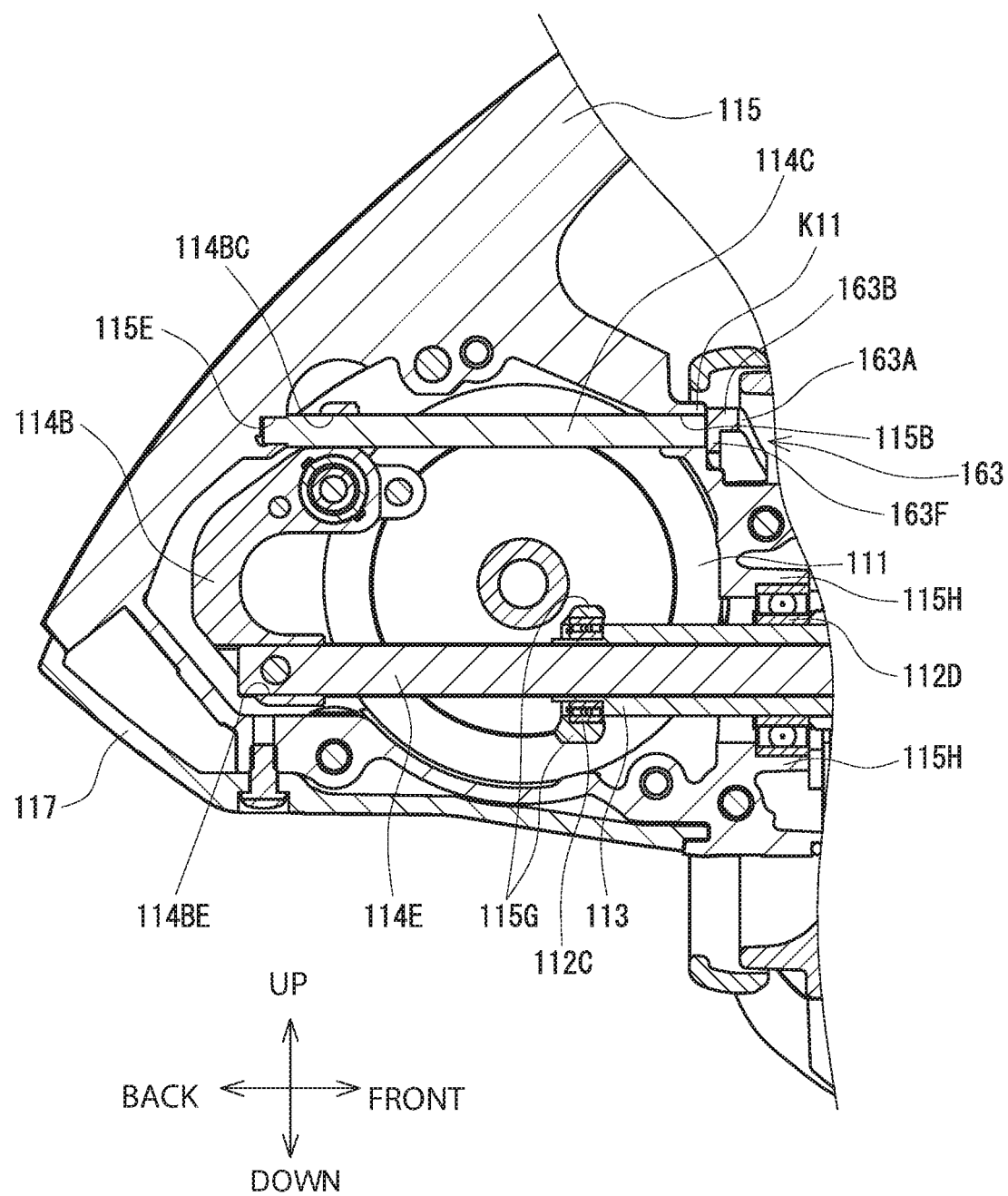
FIG. 3 is a cross-sectional view taken by cutting the spinning reel according to an embodiment of the present invention with a planar surface that extends in the front-back and vertical directions and that passes through the first guide pin.

The drive gear 111 comprises a gear shaft 111A and a gear portion 111B. The gear shaft 111A is cylindrical and is screwed together with a handle shaft 121, which is the rotary shaft of the handle 120. The handle 120 is thereby attached to the drive gear 111. The gear portion 111B is integrally formed with the gear shaft 111A and is disc-shaped, and teeth (facing the right side) are disposed on the peripheral edge portion of the drive gear 111. The drive gear 111 rotates together with the handle 120. One end portion of the drive gear 111 (one end portion of the gear shaft 111A) is rotatably supported by the second housing member 116 via a ball bearing 112A (FIG. 2). The other end portion of the drive gear 111 (other end portion of the gear shaft 111A) is rotatably supported by the first housing member 115 via a ball bearing 112B (FIG. 2). The drive gear 111 meshes and works cooperatively with the pinion gear 113 (FIG. 3). A rotor 140 is attached to the pinion gear 113. Thus, the rotation of the handle 120 rotates the drive gear 111 and the pinion gear 113, and rotates the rotor 140.

Figure 4:
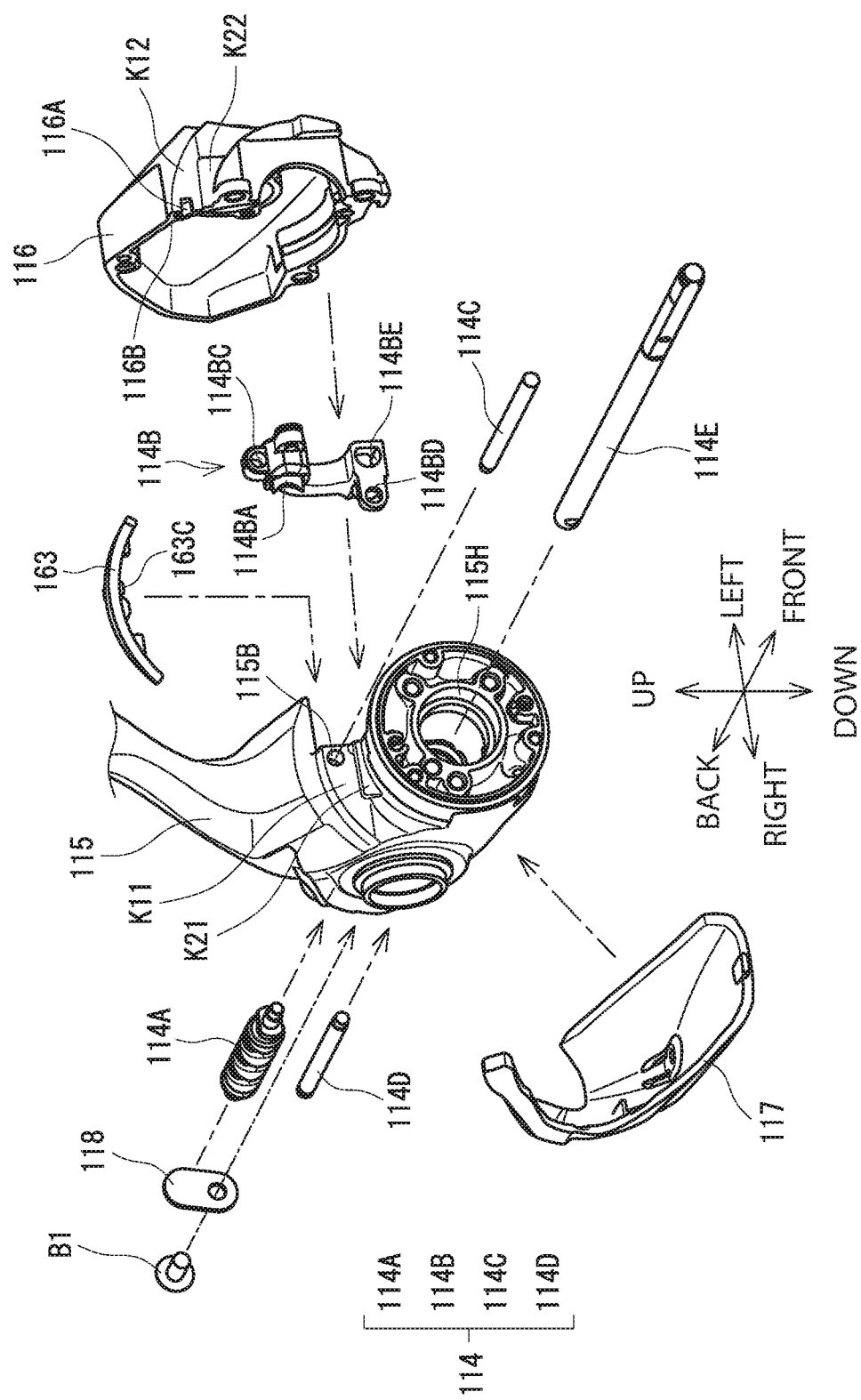
FIG. 4 is an exploded perspective view of a portion of the spinning reel according to an embodiment of the present invention.
Figure 5:
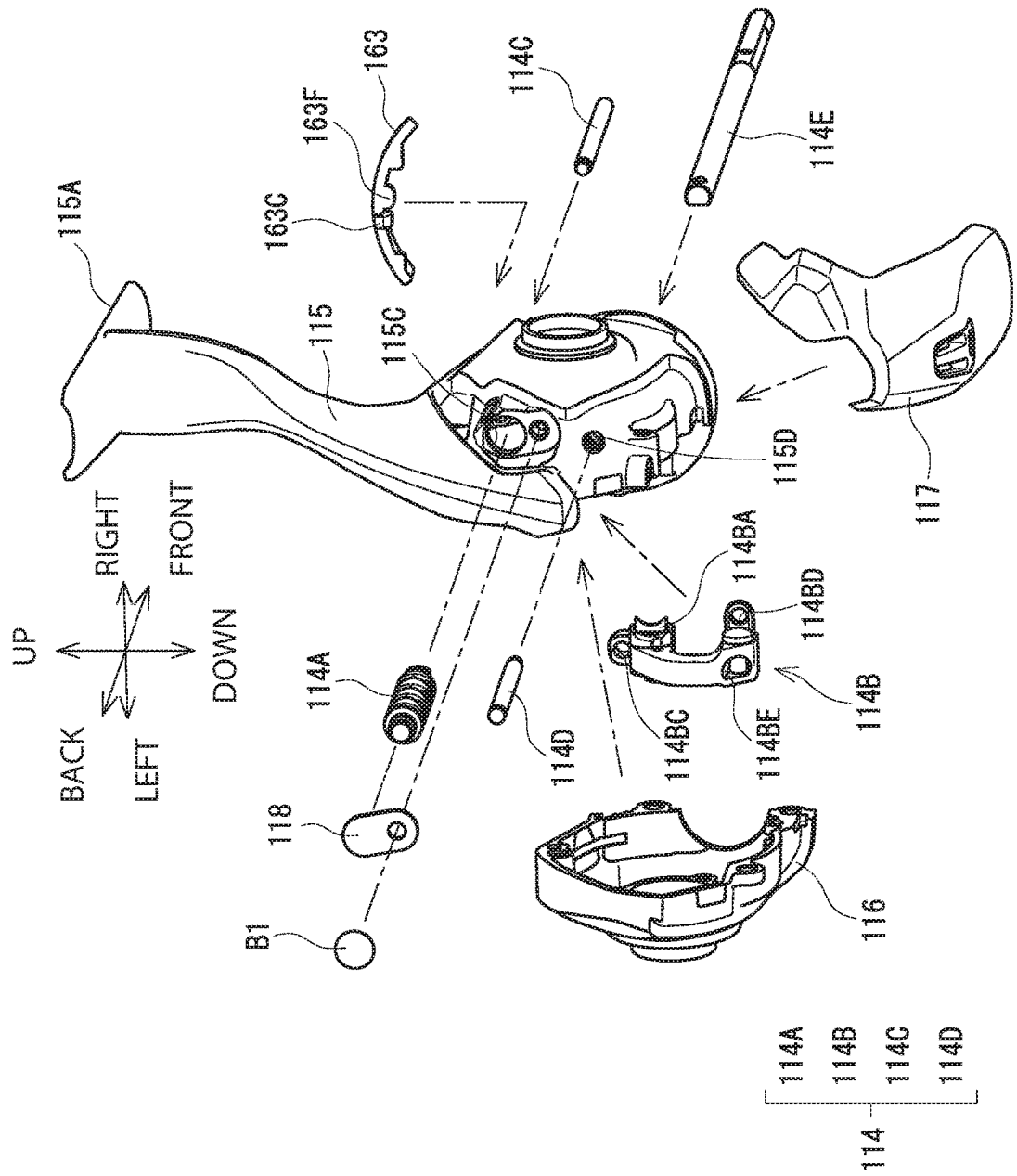
FIG. 5 is an exploded perspective view of a portion of the spinning reel according to an embodiment of the present invention.

The oscillation mechanism 114 moves the spool 130 in the front-back direction. As shown in FIGS. 3-5, the oscillation mechanism 114 comprises a worm shaft (also called a cross gear) 114A, a slider 114B, a first guide pin 114C, a second guide pin 114D, and a spool shaft 114E.

The rotation of the pinion gear 113 is transmitted to the worm shaft 114A via the plurality of gears. Therefore, the worm shaft 114A rotates in conjunction with the rotation of the handle 120. The plurality of gears includes, for example, a first gear that meshes with the pinion gear 113, a second gear that meshes with the first gear, and a third gear that meshes with the second gear, is attached to the worm shaft 114A, and rotates together with the worm shaft 114A.

The slider 114B engages the worm shaft 114A by the engagement portion 114BA and moves in reciprocating fashion in the front-back direction with the rotation of the worm shaft 114A. The slider first guide pin 114C extends in the front-back direction and passes through the through-hole 114BC of the slider 114B. The second guide pin 114D extends in the front-back direction and passes through the through-hole 114BD of the slider 114B. The first guide pin 114C and the second guide pin 114D guide the movement of the slider 114B in the front-back direction.

The spool shaft 114E extends in the front-back direction, passes through the through-hole 114BE of the slider 114B, and is fixed to the slider 114B. The spool shaft 114E moves in the front-back direction together with the slider 114B and penetrates the pinion gear 113 in sliding fashion with respect to the pinion gear 113 such that the spool shaft 114E does not rotate even when the pinion gear 113 rotates, and the pinion gear 113 does not move in the front-back direction even if the spool shaft 114E moves in the front-back direction. The center axis of the spool shaft 114E and the axis of rotation of the pinion gear 113 (also the axis of rotation of the rotor 140) coincide. The spool 130 is attached to the spool shaft 114E. Therefore, the spool 130 moves in the front-back direction with the front-back directional movement of the spool shaft 114E.

With the configuration described above, the oscillation mechanism 114 and the plurality of gears described above convert the rotation of the handle 120 into movement of the spool 130 along the front-back direction. The oscillation mechanism 114 moves the spool 130 in the front-back direction in accordance with the rotation of the handle 120. The worm shaft 114A, a large portion of the slider 114B, and the first guide pin 114C of the oscillation mechanism 114 are positioned above the center axis of the spool shaft 114E (which coincides with the axis of rotation of the rotor 140). It is thereby possible to bring the center of gravity of the spinning reel 100 closer to the rod side (which is beneficial, for example, when casting).

The first housing member 115 comprises a reel foot 115A that is used for attachment to the fishing rod. A second housing member 116 is fixed to the first housing member 115 by means of a bolt, which is not shown in FIG. 3, etc. The first housing member 115 and the second housing member 116 constitute a housing K of the reel body 110 that houses the drive gear 111, ball bearings 112A-112D, the pinion gear 113, the oscillation mechanism 114, and the plurality of gears.

Figure 8:
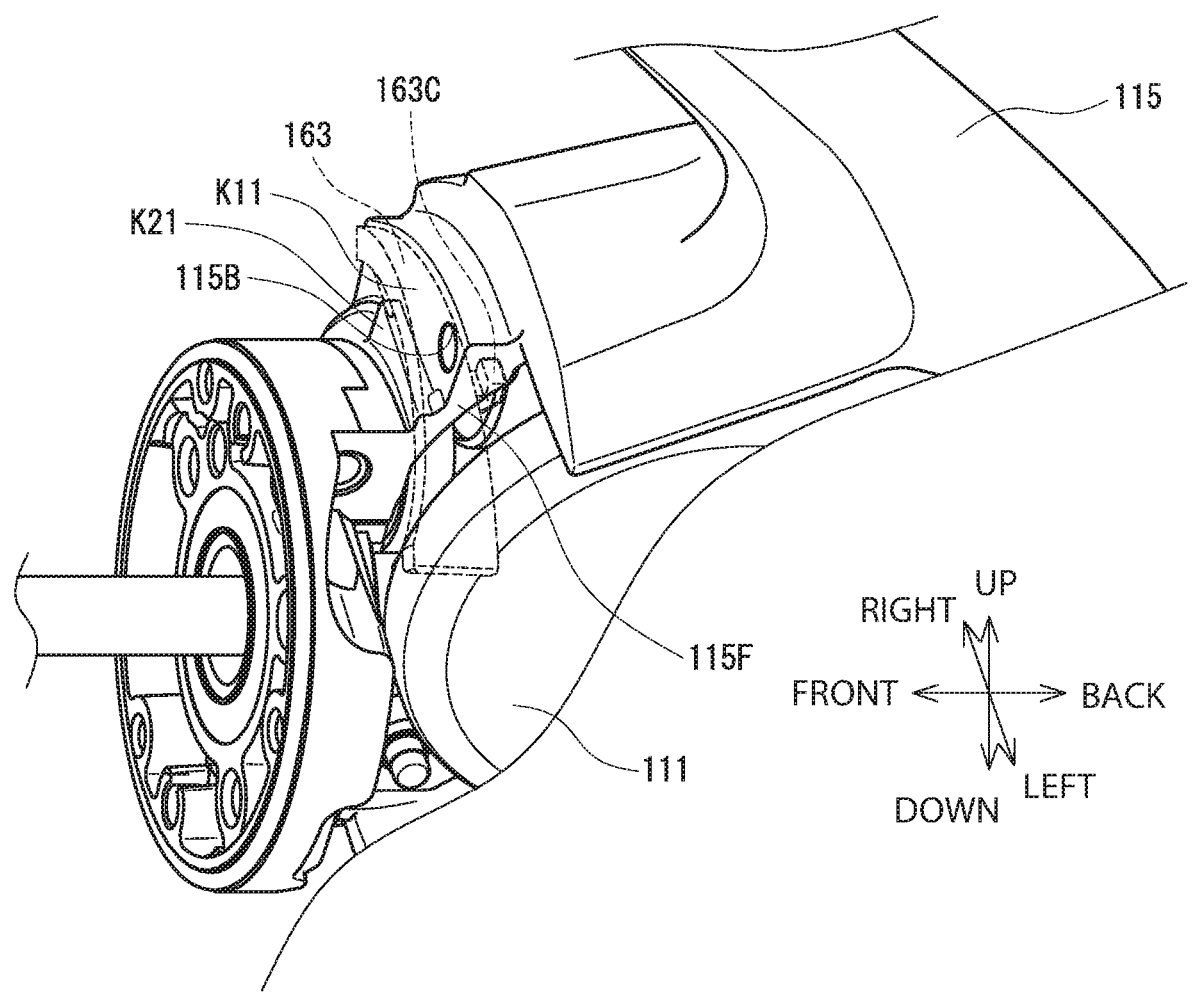
FIG. 8 is a perspective view showing the positional relationship between the abutting member and the first housing member.
Figure 9:
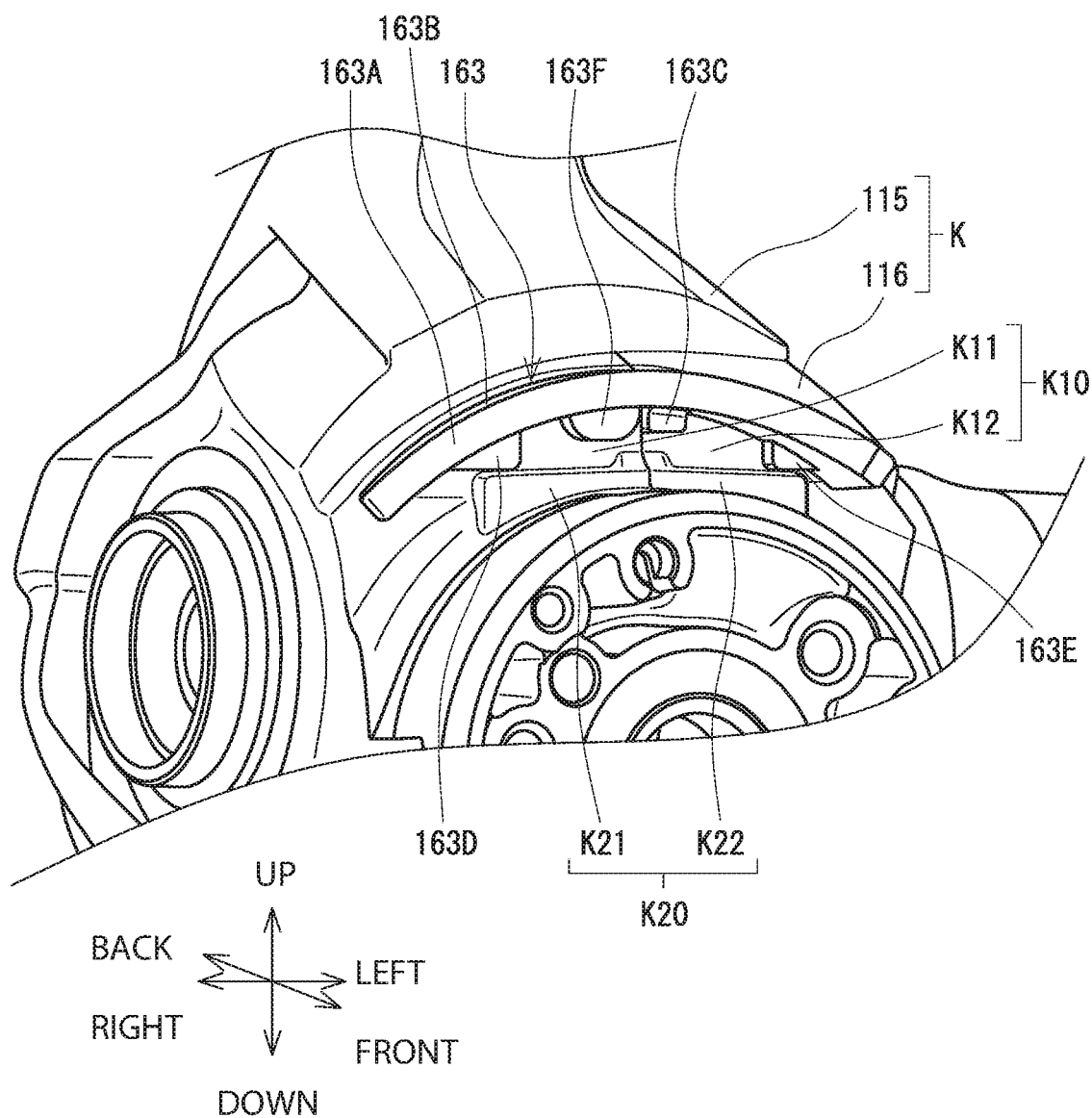
FIG. 9 is a perspective view showing a case in which the abutting member, the first housing member, and the second housing member are combined.

The housing K includes, at the front part (front side portion) thereof, a planar portion K10 having a planar surface that faces forward (also called the front surface or the front wall), and a projecting portion K20 that projects forward from the planar surface of the planar portion K10 (also refer to FIGS. 8 and 9). The portion constituting the planar portion K10 of the first housing member 115 is referred to as the planar portion K11, and the portion constituting the planar portion K10 of the second housing member 116 is referred to as the planar portion K12. The portion constituting the projecting portion K20 of the first housing member 115 is referred to as the projecting portion K21, and the portion constituting the projecting portion K20 of the second housing member 116 is referred to as the projecting portion K22.

As shown in FIGS. 4, 5, etc., the first housing member 115 includes a first through-hole 115B on the planar portion K11 of the housing K, and includes a second through-hole 115C and a third through-hole 115D at the rear part of the first housing member 115. In addition, the first housing member 115 includes a bottomed hole 115E on the inner surface of the rear part, and further includes support portions 115G, 115H that rotatably support the spool shaft 114E via the ball bearings 112C and 112D. The support portion 115H is positioned at the front end of the first housing member 115 and forms a through-hole through which the spool shaft 114E passes. The first through-hole 115B is positioned above the support portion 115G and the support portion 115H. The first through-hole 115B is positioned above the center axis of the spool shaft 114E or the axis of rotation of the rotor 140.

During assembly of the spinning reel 100, the first guide pin 114C is inserted into the first housing member 115 from the first through-hole 115B (that is, from the front side) and is assembled inside the first housing member 115. Specifically, the rear end of the first guide pin 114C is supported by the bottomed hole 115E, and the front end of the first guide pin 114C is supported by the first through-hole 115B (FIG. 3). The first housing member 115 cannot be inserted from the rear side of the first housing member 115. The front end of the first guide pin 114C is supported by the first through-hole 115B (FIG. 3).

During assembly of the spinning reel 100, the worm shaft 114A is inserted into the first housing member 115 from the second through-hole 115C (that is, from the rear side) and is assembled inside the first housing member 115. The second guide pin 114D is inserted into the first housing member 115 from the third through-hole 115D (that is, from the rear side) and is assembled inside the first housing member 115. The worm shaft 114A is rotatably supported by a ball bearing. The second through-hole 115C is closed with the plate-like lid 118. The plate-like lid 118 is fixed to the first housing member 115 using a bolt B1.

The second housing member 116 comprises a hole 116A for fixing the abutting member 163, which is described below (details will be described below).

The rear cover 117 is attached to a lower rear part of the housing K obtained by combining the first housing member 115 and the second housing member 116 using a bolt, which is not shown, and covers the lower rear part of the housing K. In particular, the rear cover 117 covers the plate-like lid 118 (second through-hole 115C), the third through-hole 115D, etc., but does not cover the portion of the first housing member 115, which contains the bottomed hole 115E. The rear cover 117 is therefore small.

Rotor 140

The rotor 140 can be rotated about an axis (axis of rotation of the pinion gear 113) that coincides with the center axis of the spool 130 (center axis of the spool shaft 114E). As shown in FIG. 1, the rotor 140 includes a rotor body 141, a first cover 142, and a second cover 143 (also refer to FIG. 6). A first arm 141A and a second arm 141B that extend in the front-back direction are disposed respectively at the ends of the rotor body 141. The first cover 142 covers the first arm 141A and the second cover 143 covers the second arm 141B. A bail reversing mechanism 160 (FIG. 6), which is described below, is disposed between the second cover 143 and the second arm 1141B.

Bail Arm 150

As shown in FIG. 1, etc., the bail arm 150 comprises a bail 151, and a first bail support member 152 and a second bail support member 153 that support the bail 151. The first bail support member 152 and the second bail support member 153 are pivotably attached, respectively, to the first arm 141A and the second arm 141B of the rotor 140, such that the bail arm 150 is pivotable between a line-winding posture (first posture) and a line-casting posture (second posture). The first bail support member 152 has a line roller 152A that guides the fishing line.

Bail Reversing Mechanism 160

Figure 6:
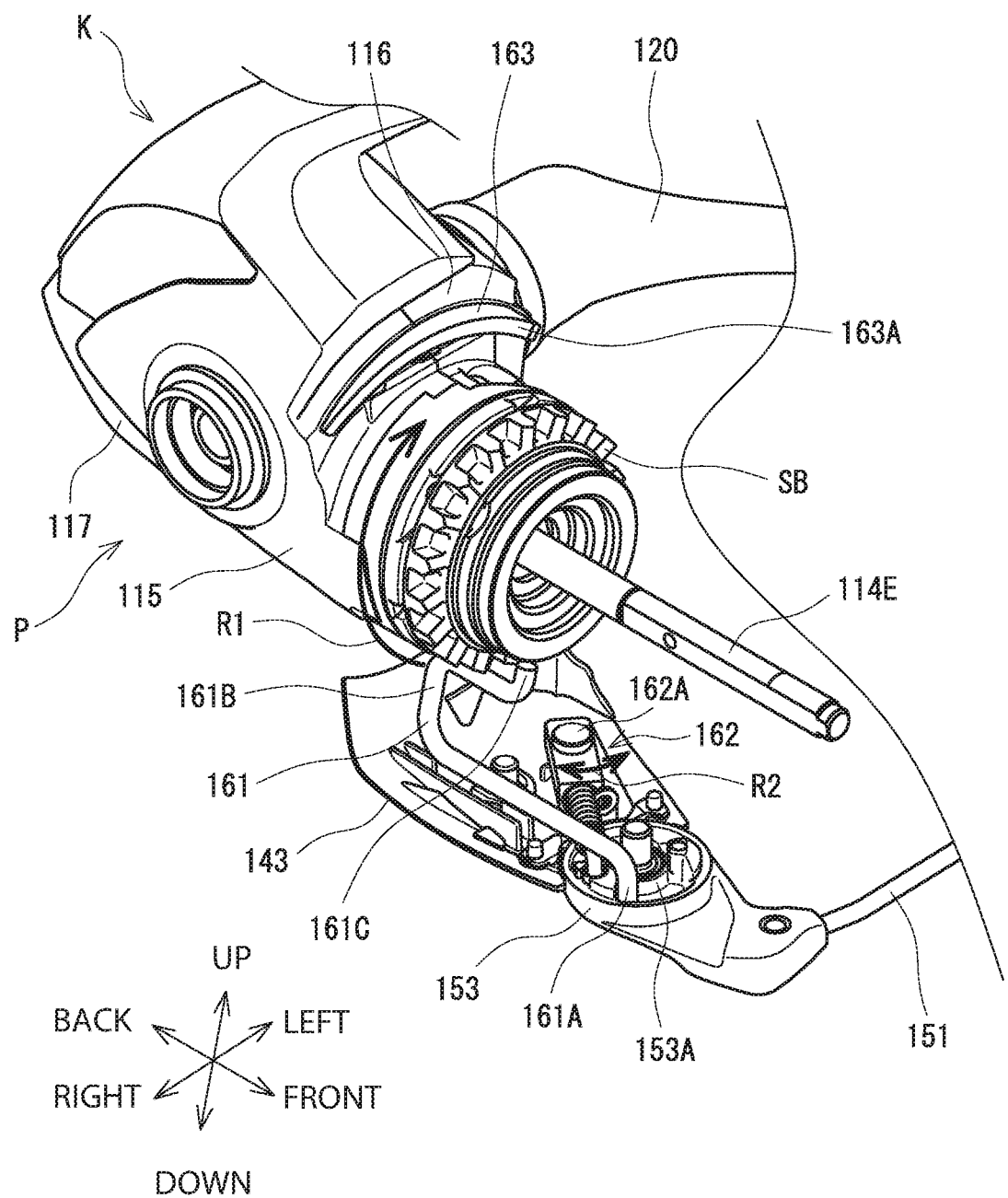
FIG. 6 is a perspective view for describing a toggle spring device of the spinning reel according to an embodiment of the present invention, in which some of the members of the spinning reel have been omitted.
Figure 7A:
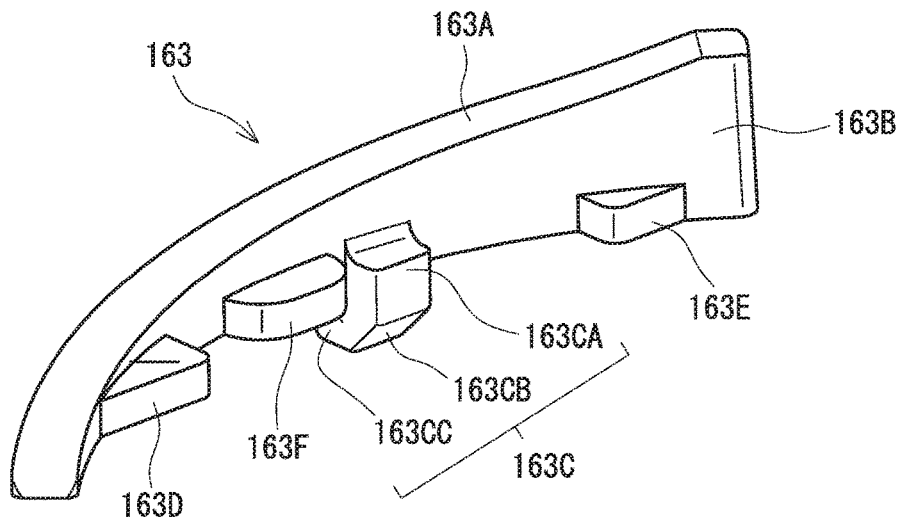
FIG. 7A is a perspective view of an abutting member.
Figure 7B:
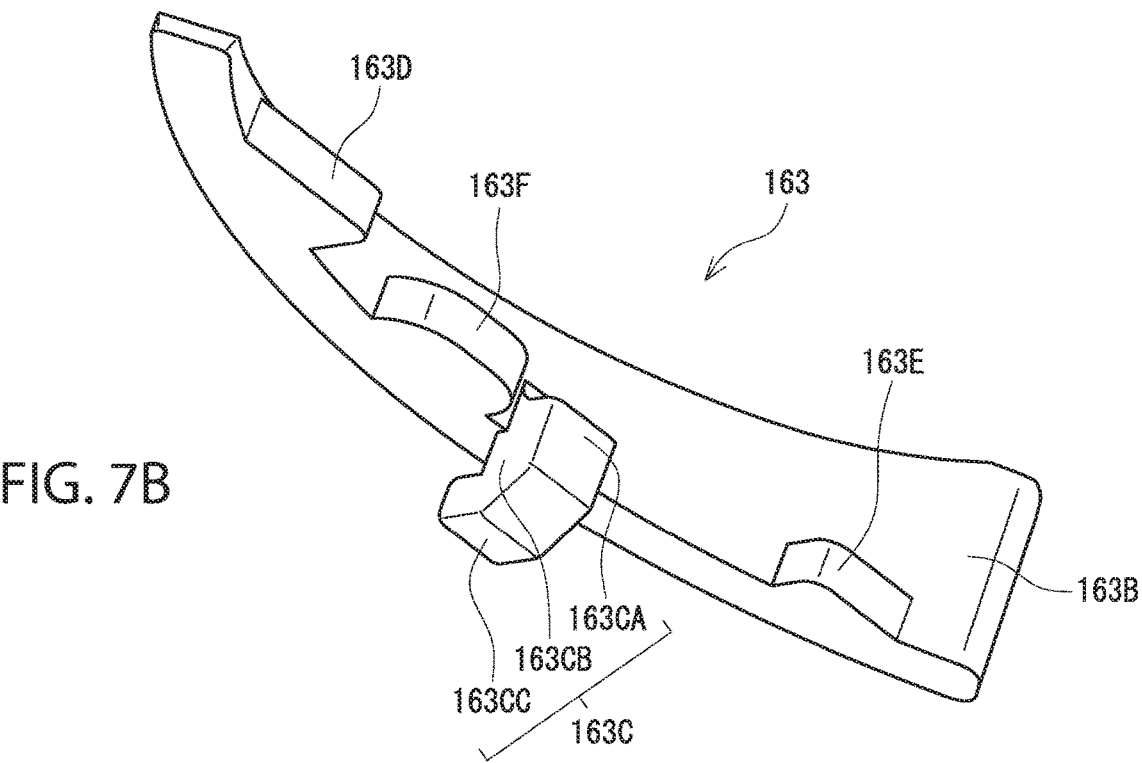
FIG. 7B is a perspective view of the abutting member viewed from a different angle than FIG. 7A.

The spinning reel 100 also comprises a bail reversing mechanism 160 (FIG. 6, etc.) that returns (reverses) the bail arm 150 to the line-winding posture (first posture) and the line-casting posture (second posture). The bail reversing mechanism 160 also has the function of maintaining the posture of the bail arm 150. As shown in FIG. 6, etc., the bail reversing mechanism 160 comprises a moving member 161, a toggle spring device (returning device) 162, and an abutting member 163. The moving member 161 and the toggle spring device 162 are housed between the second arm 141B and the second cover 143.

The moving member 161 is formed by bending a metal wire material. The moving member 161 is disposed on the second bail support member 153. Specifically, one end portion 161A of the moving member 161 engages an arc-shaped groove 153A disposed on the second bail support member 153. The moving member 161 is configured to be guided in the front-back direction by a groove (not shown) that is on the second arm 141B and that extends in the front-back direction.

The moving member 161 can be positioned in a first position (front, forward) and a second position (rear, behind) as one end portion 161A thereof is guided by the groove 153A in accordance with the pivoting of the bail arm 150. When the bail arm 150 is in the line-winding posture (first posture) (the state shown in FIGS. 1 and 6), the moving member 161 is positioned in the first position (the position in FIG. 6). On the other hand, when the bail arm 150 is in the line-casting posture (second posture), the moving member 161 is positioned in the second position (behind the position in FIG. 6). The moving member 161 rotates together with the rotor 140 at the first position or the second position by rotation of the rotor 140.

When the moving member 161 is in the second position, the other end portion 161C of the moving member 161 engages the irregularities of a braking member SB to brake the rotation of the rotor 140. Furthermore, when the moving member 161 is in the second position, if the rotor 140 is rotated in the direction R1 in which the fishing-line is wound about the spool 130 (hereinafter referred to as the line-winding direction), an intermediate portion 161B of the moving member 161 (the rear end portion that extends in the radial direction) abuts the abutting member 163.

One end of the toggle spring device 162 engages the second bail support member 153 and the other end is pivotably fixed to the second cover 143. One end of the toggle spring device 162 is moved by pivoting of the bail arm 150 (in particular the second bail support member 153), and the toggle spring device 162 thus pivots about the axis 162A of the other end (refer to arrow R2). The toggle spring device 162 utilizes the biasing force of the spring to bias the bail arm 150 into either the line-winding posture (first posture) or the line-casting posture (second posture) about the dead point and to hold the bail arm 150 in the line-winding posture (first posture) or the line-casting posture (second posture).

The abutting member 163 is fixed to the planar portion K11 of the housing K, which is formed by the first housing member 115 and the second housing member 116. The abutting member 163 has an inclined surface 163A on the front surface thereof.

As the moving member 161 rotates in the line-winding direction R1 of the fishing line in the second position, the intermediate portion 161B of the moving member 161 (the moving member 161 when the bail arm 150 is in the line-casting posture (second posture)) makes contact with the inclined surface 163A of the abutting member 163, and ascends the inclined surface 163A while in contact with the surface. The moving member 161 thereby moves toward the first position (forward). In this manner, the abutting member 163 abuts the moving member 161, which rotates in the second position and moves the moving member toward the first position. When the intermediate portion 161B ascends the inclined surface 163A to a certain extent and exceeds the dead center position, the toggle spring device 162, which has been biased to the line-casting posture (a second posture), switches biasing directions to the line-winding posture (first posture) side and thereby pivots the bail arm 150 to return the bail arm 150 to the line-winding posture (first posture) from the line-casting posture (a second posture). In this manner, when the moving member 161 moves toward the first position, the toggle spring device 162 returns the bail arm 150 to the line-winding posture (first posture) from the line-casting posture (a second posture).

Abutting Member 163

As shown in FIGS. 7A-9, the abutting member 163 comprises an abutting portion 163B, a projecting portion 163C, a rotation stopper 163D, a rotation stopper 163E, and a retainer 163F. These elements are integrally formed from synthetic resin, or the like.

The abutting portion 163B is a plate-like member that is arc-shaped when viewed from the front (also refer to FIGS. 4 and 5). The inclined surface 163A constitutes the front surface of the abutting portion 163B.

The projecting portion 163C has the form of an L and projects rearward from the abutting portion 163B. The projecting portion 163C includes a first portion 163CA that projects from the rear end portion of the abutting portion 163B to the radially inward side (spool shaft 114E side) of the spool 130, a second portion 163CB that projects rearward from the first portion 163CA and that is positioned behind the rear end of the abutting portion 163B, and a third portion 163CC that projects radially outward from the second portion 163CB.

The abutting member 163 is fixed to the housing K, which is formed by the first housing member 115 and the second housing member 116, by sandwiching the projecting portion 163C between the first housing member 115 and the second housing member 116 from the left-right direction. Here, the projecting portion 163C is inserted into an L-shaped hole 116A (FIG. 4) disposed in the second housing member 116 so as to be sandwiched between and held by the first housing member 115 and the second housing member 116, and so that the first housing member 115 covers the hole 116A on the right side (FIG. 4). The abutting member 163 is thereby disposed on the front surface of the planar portion K10 of the housing K. Specifically, the abutting portion 163B is arranged on the front surface of the planar portion K10 of the housing K. The shape of the hole 116A is obtained by notching a mating surface 116B of the second housing member 116 that mates with the first housing member 115 and the planar portion K12 of the second housing member 116, and the projecting portion 163C is inserted into the hole 116A from the mating surface 116B side. The portion of the first housing member 115 that covers the hole 116A, that is, the mating surface 115F that is mated to the second housing member 116 is a planar surface (FIG. 8).

The hole 116A (FIG. 4) is has a shape that matches the projecting portion 163C, so that the second housing member 116 does not rattle. The hole 116A accommodates all of the portions of the projecting portion 163C (second portion 163CB and third portion 163CC) that project rearward from the abutting portion 163B. The abutting member 163 is thereby stably held by the second housing member 116. By providing the projecting portion 163C with the third portion 163CC that projects upward, the third portion 163CC catches on the inner surface of the hole 116A, thereby retaining the abutting member 163 with respect to the housing K.

In this embodiment, because the moving member 161 and the toggle spring device 162 are disposed on the second bail support member 153 side, which does not comprise a line roller 152A, the weight of the first bail support member 152 and the weight of the second bail support member 153 of the bail arm 150 are approximately the same, and thus the rotational balance of the rotor 140 is favorable. The bail arm 150 is pivoted into the line-casting posture (a second posture) with the user's left hand, in a state in which the first bail support member 152, which has the line roller 152A, is positioned on the fishing rod side (upper side) and the second bail support member 153 is positioned on the opposite side (lower side) (a state in which the moving member 161 is positioned on the lower side). If the abutting member 163 were to be posited downward, there would be the risk that immediately after the pivoting of the bail arm 150 to the line-casting posture (a second posture), the moving member 161 would inadvertently abut the abutting member 163 (the bail arm would inadvertently return to the line-winding posture (first posture)). In this embodiment, the hole 116A is positioned above the center axis of the spool 130 or the axis of rotation of the rotor 140 in the second housing member 116; thus, the inconvenience described above is eliminated by positioning the abutting member 163 above the center axis of the spool 130 or the axis of rotation of the rotor 140.

The rotation stopper 163D and the rotation stopper 163E are two plate-like portions that project radially inward of the spool 130 from the rear end portion and the left and right end portions of the abutting portion 163B. The rotation stopper 163D and the rotation stopper 163E are disposed on the front surface of the planar portion K10 and abut the side surface of the projecting portion K20. Specifically, the rotation stopper 163D is disposed on the front surface of the planar portion K11 and abuts the side surface of the projecting portion K21. The rotation stopper 163E is disposed on the front surface of the planar portion K12 and abuts the side surface of the projecting portion K22. As a result, for example, when the intermediate portion 161B of the moving member 161 ascends the inclined surface 163A, it is possible to prevent the abutting member 163 from being rotated by the force that is received by the inclined surface 163A.

The retainer 163F is a semicircular disc-shaped portion that projects radially inward toward the spool 130 from the rear end portion and the left-right direction center of the abutting portion 163B. The retainer 163F is in a position that covers the first through-hole 115B of the first housing member 115 together with the abutting portion 163B. With such a configuration, the retainer 163F and the portion of the abutting portion 163B in the vicinity of the retainer 163F constitute a blocking portion that blocks the first through-hole 115B by covering the first through-hole 115B from the front. Because the first guide pin 114C is inserted into the first through-hole 115B and the front end of the first guide pin 114C is supported by the first through-hole 115B, the blocking portion prevents the first guide pin 114C from falling out of the first through-hole 115B, i.e., retains the first guide pin 114C.

Effects of the Embodiment

In this embodiment, the first guide pin 114C is prevented from falling forward from the first through-hole 115B, which is disposed in a front part of the housing K (planar portion K11), by the abutting member 163 blocking the first through-hole 115B. That is, the abutting member 163 also serves the function of a retainer for the first guide pin 114C, in addition to the original function of moving the moving member toward the first position. Thus, a dedicated retaining member for preventing the first guide pin 114C from falling out of the first through-hole 115B is not required (and the number of parts that are disposed at the front part of the reel body 110 can thereby be reduced). In addition, the rear cover 117 covers the plate-like lid 118 (second through-hole 115C) and the third through-hole 115D, but does not cover the portion of the first housing member 115 in which the bottomed hole 115E is disposed. The rear cover 117 can thus be small to achieve good design properties. Additionally, in the embodiment described above, the first guide pin 114C and the abutting member 163 are positioned above the axis of rotation of the rotor 140, as described above. Thus, it is possible to bring the positions of the two elements closer together, and thereby keep the abutting member 163 from becoming too large and allowing for an efficient retaining effect. In particular, the first through-hole 115B that supports the first guide pin 114C is disposed in the vicinity of the abutting member 163, that is, on a planar portion K10 of the housing K (the same front surface on which the abutting member 163 is disposed), which is the portion in which the abutting member 163 is disposed; as a result, it is possible to keep the abutting member 163 from being too large and to provide an efficient retention effect. As shown in FIG. 4, the worm shaft (also called a cross gear) 114A, the slider 114B, the first guide pin 114C, and the abutting member 163 are preferably above the spool shaft 114E (any one of which may be above). The second guide pin 114D may be disposed above the spool shaft 114E (or the center axis thereof).

By providing the first through-hole 115B, which supports the first guide pin 114C and the supporting portion 115G and the supporting portion 115H, which rotatably support the spool shaft 114E on the first housing member 115, these elements can be consolidated on the first housing member 115. The assembly of the spinning reel 100 is thereby facilitated. Furthermore, by providing the first through-hole 115B and the hole 116A above the support portion 115G and the support portion 115H, it is possible to bring the first through-hole 115B that supports the first guide pin 114C closer to the hole 116A for fixing the abutting member 163; it is thereby possible to prevent the abutting member 163, which also serves as a retainer of the first through-hole 115B, from being too large, providing an efficient retention effect.

By utilizing the upper surface of the abutting member 163 as an inclined surface 163A on which the moving member 161 (second intermediate portion 161B) ascends, the moving member 161 can be smoothly rotated (that is, the rotation of the rotor 140), even after the moving member 161 abuts the abutting member 163.

In the embodiment described above, because the abutting member 163 is fixed by sandwiching the projecting portion 163C between the first housing member 115 and the second housing member 116 from the left-right direction, it is possible to simply fix the abutting member 163 to the housing K without using bolts. Furthermore, because the projecting portion 163C has the form of an L and an L-shaped hole 116A that corresponds to the projecting portion 163C is disposed in the second housing member 116, the third portion 163CC of the projecting portion 163C is caught on the inner wall of the hole 116A, and it is possible to efficiently prevent the abutting member 163 from falling out from the housing K with a simple configuration. In addition, because the mating surface 115F of the first housing member 115 is a planar surface, and the mating surface 115F is blocks the hole 116A, the projecting portion 163C that is inserted into the hole 116A does not protrude from the second housing member 116 in the left-right direction; therefore, the second housing member can be assembled onto the first housing member easily, with the projecting portion 163C interposed therebetween. In addition, the hole 116A accommodates all of the portions of the projecting portion 163C that project rearward of the abutting portion 163B (second portion 163CB and third portion 163CC), and the abutting member 163 is stably held by the second housing member 116.

In addition, it is possible to prevent the abutting member 163 from rotating due to the force that is received by the inclined surface 163A when the intermediate portion 161B of the moving member 161 ascends the inclined surface 163A by the rotation stopper 163D and/or the rotation stopper 163E that abuts the side surface of the projecting portion K20. It is thereby possible to strongly fix the abutting member 163.

Modified Examples

The present invention is not limited to the above-described embodiments, and modifications thereto are included in the scope of the present invention. In particular, the shape, arrangement, etc., of each member can be changed as deemed appropriate.

The housing members that form the housing K of the reel body 110 are not limited to the first housing member 115 and the second housing member 116 and may be configured by three or more housing members.

Instead of the inclined surface 163A, the front surface of the abutting member 163 can have a step onto which the moving member 161 rests. In this embodiment, the bail reversing mechanism 160 returns the position of the bail arm 150 to the line-winding posture (first posture) when the moving member 161 abuts the front surface of the abutting member 163 and rests upon the step.

It is sufficient for the blocking portion of the abutting member 163 to cover at least a portion of the first through-hole 115B. Thus, the first guide pin 114C can be prevented from falling off. A portion of the first through-hole 115B can be blocked by reducing the size of the retainer 163F, or by not providing the retainer 163F. The blocking portion of the abutting member 163 may be a projecting portion that protrudes rearward from the abutting portion 163B and enters the first through-hole 115B to block the first through-hole 115B.

It is sufficient if the projecting portion 163C comprises, for example, portions (the first portion 163CA and the second portion 163CB above) that extend in a first direction (front-back direction) and a portion (the third portion 163CC above) that extends from the portion in a direction that is different from the first direction. Thus, the projecting portion 163C is not limited to the form of an L and may have another shape. For example, instead of the third portion 163CC, it can be a T to which a projecting portion is provided that protrudes in the left and right directions or the up and down directions from the second portion 163CB. It is sufficient for the hole 116A to house the projecting portion 163C. Furthermore, it is sufficient for the hole 116A to house the projecting portion 163C. With such a configuration, it is possible to prevent the abutting member 163 from falling out of the housing K. The abutting member 163 may be fastened and fixed to the housing K by means of a screw, or the like.

By the abutting member 163 comprising engagement portions such as the projecting portion 163C or the rotation stopper 163D and/or the rotation stopper 163E, which engage with at least one of the first housing member 115 and the second housing member 116, and at least one of the first housing member 115 and the second housing member 116 including engaged portions, such as the hole 116A, or, the projecting portion K21 and/or K22, which engage \ the engagement portions, it is possible to cause the abutting member to engage the housing by an engagement between the engagement portion and the engaged portion, and, for example, it is possible to prevent movement of the abutting member. The engagement portion and the engaged portion may be other members. For example, the elements described above may be a combination of a rod member and a hole into which the rod member is inserted.

The hole 116A that houses the second portion 163CB and the third portion 163CC of the projecting portion 163C may be disposed on the first housing member 115. In this embodiment, the mating surface of the second housing member 116 is preferably a planar surface. A hole may be provided on each of the first housing member 115 and the second housing member 116, and the second portion 163CB and the third portion 163CC may be housed in the two holes.

The abutting member 163 may be fixed to the housing K by providing a projecting portion on the housing K, providing a hole in the abutting member 163, and inserting the projecting portion of the housing K into the hole of the abutting member 163.

It is sufficient for the member that is retained by the abutting member 163 (retainer 163F) to be a rod member, and can be the worm shaft 114A, the second guide pin 114D, or the like. It is not necessary that the member that is retained by the abutting member 163 (retainer 163F) be a component member of the oscillation mechanism 114. The retained member can be housed in the second housing member 116. In this embodiment, the holes into which the retained member are inserted are disposed in the front part (planar portion K12, and the like) of the second housing member 116. Members that are not retained (the worm shaft 114A, the second guide pin 114D, or the like, in the embodiment described above) can be housed in the second housing member 116. Depending on the size of the first through-hole 115B, it is possible to not provide the retainer 163F and carry out the retention by the rear surface of the abutting member 163.

It is possible to omit one of the projecting portion K21 and the projecting portion K22, and to omit one of the corresponding rotation stopper 163D and the rotation stopper 163E.

What is claimed is:

1. A spinning reel for fishing, comprising:
   a handle;
   a housing that houses a drive gear connected to the handle;
   a rotor rotatable with respect to the housing in accordance with rotation of the handle;
   a bail arm attached to the rotor and pivotable between a first posture for winding a fishing line around a spool and a second posture for casting the fishing line from the spool to forward direction;
   a moving member positioned in a first position when the bail arm is in the first posture, positioned in a second position behind the first position when the bail arm is in the second posture, and rotatable together with the rotor;
   an abutting member attached to the housing and abutting the moving member in the second position to move the moving member toward the first position; and
   a returning device configured to return the bail arm to the first posture from the second posture when the moving member moves toward the first position from the second position,
   the housing
      further houses a rod member,
      and comprises a through-hole, through which the rod member is configured to pass, disposed at a front part of the housing, and supporting a front end of the rod member, and
      the abutting member comprises a blocking portion projecting radially inwardly, the blocking portion blocking at least a portion of the through-hole.

2. The spinning reel recited in claim 1, wherein
   the abutting member has an inclined surface configured to move the moving member from the second position toward the first position as the rotor rotates.

3. The spinning reel according to claim 1, wherein
   the housing comprises a first housing member supporting a first end portion of the drive gear and a second housing member supporting a second end portion of the drive gear, and
   the first housing member comprises support portions that work cooperatively with the drive gear and that rotatably support a pinion gear that rotates the rotor, and comprises the through-hole above the support portions.

4. A spinning reel for fishing, comprising:
   a handle;
   a housing that houses a drive gear connected to the handle;
   a rotor rotatable with respect to the housing in accordance with rotation of the handle;
   a bail arm attached to the rotor and pivotable between a first posture for winding a fishing line around a spool and a second posture for casting the fishing line from the spool to forward direction;
   a moving member positioned in a first position when the bail arm is in the first posture, positioned in a second position behind the first position when the bail arm is in the second posture, and rotatable together with the rotor;
   an abutting member attached to the housing and abutting the moving member in the second position to move the moving member toward the first position; and
   a returning device configured to return the bail arm to the first posture from the second posture when the moving member moves toward the first position from the second position,
   the housing
      further housing a rod member, and
      comprising a through-hole, through which the rod member is configured to pass, disposed at a front part of the housing, and supporting a front end of the rod member,
   the abutting member comprising a blocking portion blocking at least a portion of the through-hole,
   the housing comprising a first housing member supporting a first end portion of the drive gear and a second housing member supporting a second end portion of the drive gear,
   the abutting member comprising an engagement portion engaging at least one of the first housing member and the second housing member, and
   at least one of the first housing member and the second housing member comprising an engaged portion that engages the engagement portion,
   at least one of the first housing member and the second housing member comprising a planar portion having a planar surface on which the abutting member is disposed,
   the engagement portion comprising a first engagement portion that extends in a first direction and a second engagement portion that extends from the first engagement portion in a direction different from the first direction, and
   the engaged portion being a hole disposed in the planar portion and houses the engagement portion.

5. The spinning reel recited in claim 4, wherein
   the engagement portion and the engaged portion have an L shape.

6. A spinning reel for fishing, comprising;
a handle;
a housing that houses a drive gear connected to the handle;
a rotor rotatable with respect to the housing in accordance with rotation of the handle;
a bail arm attached to the rotor and pivotable between a first posture for winding a fishing line around a spool and a second posture for casting the fishing line from the spool to forward direction;
a moving member positioned in a first position when the bail arm is in the first posture, positioned in a second position behind the first position when the bail arm is in the second posture, and rotatable together with the rotor;
an abutting member attached to the housing and abutting the moving member in the second position to move the moving member toward the first position; and
a returning device configured to return the bail arm to the first posture from the second posture when the moving member moves toward the first position from the second position,
the housing
further housing a rod member, and
comprising a through-hole, through which the rod member is configured to pass, disposed at a front part of the housing, and supporting a front end of the rod member,
the abutting member comprising a blocking portion blocking at least a portion of the through-hole,
the housing comprising, a first housing member supporting a first end portion of the drive gear and a second housing member supporting a second end portion of the drive gear,
the abutting member comprising an engagement portion engaging at least one of the first housing member and the second housing member, and
at least one of the first housing member and the second housing member comprising an engaged portion that engages the engagement portion,
the engaged portion being a notch on an abutting end surface on one of the first housing member or the second housing member and abutting the other of the first housing member or the second housing member, and
the engagement portion sandwiched between the first housing member and the second housing member.

7. A spinning reel for fishing, comprising:
a handle;
a housing that houses a drive gear connected to the handle;
a rotor rotatable with respect to the housing in accordance with rotation of the handle;
a bail arm attached to the rotor and pivotable between a first posture for winding a fishing line around a spool and a second posture for casting the fishing line from the spool to forward direction;
a moving member positioned in a first position when the bail arm is in the first posture, positioned in a second position behind the first position when the bail arm is in the second posture, and rotatable together with the rotor;
an abutting member attached to the housing and abutting the moving member in the second position to move the moving member toward the first position; and
a returning device configured to return the bail arm to the first posture from the second posture when the moving member moves toward the first position from the second position,
the housing
further housing a rod member, and
comprising a through-hole, through which the rod member is configured to pass, disposed at a front part of the housing, and supporting a front end of the rod member,
the abutting member comprising a blocking portion blocking at least a portion of the through-hole,
the housing comprising a first housing member supporting a first end portion of the drive gear and a second housing member supporting a second end portion of the drive gear,
the abutting member comprising an engagement portion engaging at least one of the first housing member and the second housing member, and
at least one of the first housing member and the second housing member comprising an engaged portion that engages the engagement portion, and
at least one of the first housing member and the second housing member comprising a planar portion having a planar surface on which the abutting member is disposed,
the engaged portion being a projecting portion that projects forward from the planar portion, and
the engagement portion abutting the projecting portion.

8. A spinning reel according for fishing, comprising:
a handle;
a housing that houses a drive gear connected to the handle;
a rotor rotatable with respect to the housing in accordance with rotation of the handle;
a bail arm attached to the rotor and pivotable between a first posture for winding a fishing line around a spool and a second posture for casting the fishing line from the spool to forward direction;
a moving member positioned in a first position when the bail arm is in the first posture, positioned in a second position behind the first position when the bail arm is in the second posture, and rotatable together with the rotor;
an abutting member attached to the housing and abutting the moving member in the second position to move the moving member toward the first position; and
a returning device configured to return the bail arm to the first posture from the second posture when the moving member moves toward the first position from the second position,
the housing
further housing a rod member,
and comprising a through-hole, through which the rod member is configured to pass, disposed at a front part of the housing, and supporting a front end of the rod member, and
the abutting member comprising a blocking portion blocking at least a portion of the through-hole,
the rod member being a guide pin that is a component member of an oscillation mechanism configured to move the spool in a front-back direction of the rotor, and to guide movement of a slider in the front-back direction.

* * * * *